United States Patent [19]
Okabayashi et al.

[11] Patent Number: 5,253,346
[45] Date of Patent: Oct. 12, 1993

[54] METHOD AND APPARATUS FOR DATA TRANSFER BETWEEN PROCESSOR ELEMENTS

[75] Inventors: Ichiro Okabayashi; Hiroshi Kadota; Katsuyuki Kaneko, all of Osaka, Japan

[73] Assignee: Matsushita Electric Industrial Co., Ltd., Osaka, Japan

[21] Appl. No.: 556,076

[22] Filed: Jul. 23, 1990

[30] Foreign Application Priority Data

Jul. 21, 1989 [JP] Japan .................. 1-189698

[51] Int. Cl.$^5$ ............................................ G06F 13/38
[52] U.S. Cl. ...................... 395/325; 364/DIG. 1; 364/260.1; 364/260.2; 364/229.2
[58] Field of Search ............... 364/DIG. 1; 395/200, 395/325, 700

[56] References Cited

U.S. PATENT DOCUMENTS

| | | |
|---|---|---|
| 4,630,260 | 12/1986 | Toy et al. |
| 5,089,953 | 2/1992 | Ludicky ............ 364/DIG. 1 |
| 5,101,478 | 3/1992 | Fu et al. ............ 364/DIG. 1 |

FOREIGN PATENT DOCUMENTS

| | | |
|---|---|---|
| 234182 | 9/1987 | European Pat. Off. |
| 64-9563 | 1/1989 | Japan . |
| 2195038 | 3/1988 | United Kingdom . |

OTHER PUBLICATIONS

Electronic Design, vol. 33, No. 27, 1985, Hasbrouck Heights, N.J., pp. 131–137; N. Lodhi: 'Assembling multiprocessor systems is a snap with off-the-shelf chips'.
Patent Abstracts of Japan, vol. 12, No. 129 (P-692)(2976) 21 Apr. 1988 and JP-A62 251 954.

Primary Examiner—Thomas M. Heckler
Attorney, Agent, or Firm—Lowe, Price, LeBlanc & Becker

[57] ABSTRACT

A method of data transfer applicable to processing elements which are interconnected by a network to form a multiprocessor system, whereby when a datum is to be transferred from a processing element to the network, the datum is sent to a transfer controller of the processing element at the same time that it is being read out from memory to be used by the processor of the processing element, or as it is being generated from the processor and written into memory. Thus, the system performance can be substantially improved, since the time required to execute each data transfer can be "hidden" within the processor execution time.

8 Claims, 12 Drawing Sheets

PROCESSOR 1 OPERATION

DATA TRANSFER CONTROLLER 3 OPERATION

PROCESSOR 1 OPERATION

DATA TRANSFER CONTROLLER 130 OPERATION

METHOD AND APPARATUS FOR DATA TRANSFER BETWEEN PROCESSOR ELEMENTS

BACKGROUND OF THE INVENTION

1. Field of Application

The present invention relates to a method and apparatus for data transfer and in particular to a method and apparatus for data transfer which is applicable to processing elements, whereby a plurality of processing elements can operate in combination as a multiprocessor system.

In the following description, the term "processing element" signifies a unit consisting of at least a processor (i.e. digital microprocessor), a memory and a data transfer controller, respectively coupled to internal data and address buses of the processing element.

2. Prior Art Technology

FIG. 1 shows an example of a prior art multiprocessor system, for describing a method of data transfer used in the prior art when a pair of processing elements operate in combination as a multiprocessor system. A processing element 124a is formed of a processor 1a, memory 2a, data transfer controller 130a, and data bus 4a, while a processing element 124b is formed of a processor 1b, memory 2b, data transfer controller 130b. The address buses are not shown. 5a, 5b denote respective transfer command signals produced by the processors 5a, 5b. 108a, 108b denote status counters whose count value represents the current data transfer status, i.e. which are used keep count of the number of data transfer commands which have been issued, 16a, 16b denote respective "count down" signals for decrementing the contents of these counters, 17a, 17b denote output signals representing the counter contents, and 18 denotes a network having a bus to which the processing elements 124a, 124b are connected via their respective data transfer controllers. 7a, 7b denote respective control sections of the data transfer controllers 16a, 16b.

With a multiprocessor system configured in this way, the process of transferring data from the processing element 124a to the processing element 124b can be executed as follows, assuming for example that each of a set of successive words, obtained as a processing result by the processor 1a and written into the memory 2a, is to be transferred to the processor element 124b. In this case, as each word is written into the memory 2a by the processor 1a, the processor 1a sends a transfer command signal to the data transfer controller 130a, and also sends signals to the data transfer controller 130a for setting into an address counter (not shown in the drawing) the address into which has been written the first of the words that are to be transferred, and for updating the address counter contents as each additional transfer command is issued. The data transfer controller 130a responds to each transfer command represented by the signal 5a by incrementing the count value of the counter circuit 108a (i.e. from a predetermined initial value). Thereafter, so long as the output signals 17a from the counter 108a represent a count value that is higher than the initial count, then each time that the data bus 4a becomes available (e.g. because the processing is currently executing internal processing) a data word whose address is specified by the address counter of the data transfer controller is read out of the memory 2a under the control of the data transfer controller 130a, and is supplied to the data transfer controller. When this occurs, the count value of the counter circuit 108a is dec- remented by one, and the address counter of the data transfer controller 130 is incremented by one. That is, the count value in the counter 108a is incremented each time a transfer command signal is generated, and is decremented each time that a data transfer subsequently occurs in response to the transfer request represented by that transfer command signal. In this way it is ensured that the number of words that are read out of the memory for data transfer will be identical the number of data transfer commands issued by the processor. The data thus supplied to the data transfer controller 130b are transferred by the data transfer controller 130b to the network 18, then to the data transfer controller 130b of the processing element 124b, to be written into the memory 2b of that processing element.

A second prior art method of data transfer for achieving multiprocessor system operation is described in Japanese Patent Laid-open No. 64-9563. FIG. 2 is a simple block diagram for describing the operation of that data transfer method. 80a, 80b denote respective processors, 20 is a dual-port memory, 21a, 22b are bus interface circuits, and 22a, 22b are sets of registers. With such a configuration, data transfer is executed in the following sequence, for the case of transferring data from the processor 80a to processor 80b. The processor 80a checks for a bit which indicates completion of read-out of data from the processor 80b to the register group 22b. If that bit is asserted, then write-in to the dual-port memory 20 is started, via the bus interface circuit 21a. When write-in has been completed, an interrupt signal is sent to the processor 80b, and a bit which indicates completion of write-in via the bus interface circuit 21a of the processor 80a is asserted. The processor 80b looks for a signal indicating completion of write-in to the processor groups 22a, 22b by the processor 80a, and when it finds that this signal is asserted, the processor 80b begins read-out of data from the memory 20 via the bus interface circuit 21b.

However with such prior art data transfer methods, several problems will arise. Specifically, in the case of the first prior art method described above, data transfer into a processing element or out from a processing element is only possible during intervals in which the data bus 4 (and address bus) of that processing element are released (i.e. when the processor of the processing element is not currently accessing the memory). If there is a high probability of the internal buses being free at any given time, then it will generally be possible for the data transfer controller, each time that a transfer command signal is issued by the processor, to access the memory soon after that (i.e. at the first occasion when the data and address buses are released by the processor) in order to read out of the memory data that are to be transferred out of the processing element, or to write into the memory data that have been transferred into the processing element from the other processing element. However in a practical multiprocessor system (and in particular in the case of a system which is used for high-speed real time simulation, which is the most important application of multiprocessor systems) the frequency of memory accessing by the processor of each processing element of the multiprocessor system is extremely high. Thus, the internal data and address buses of each processing element will rarely be in a free condition, so that it will be necessary for each data transfer to wait until the internal buses become free. Moreover in multiprocessor system applications such as simulation, the desired rate of data transfer operations can be extremely high, so that time required to execute data transfers will have an adverse effect on the overall system performance. As a result, even if the individual processing elements incorporate high speed processors, it is difficult to achieve the levels of performance that can be envisaged for such a multiprocessor system.

In the case of the second prior art method of data transfer described above, the amount and complexity of hardware required will be excessive, due to the incorporation of the dual-port memory. The difficulties which arise in implementing and controlling a dual-port memory are well known, and use of such a device is undesirable, even in the case of a multiprocessor system which contains only two processors. Moreover due to the fact that data transfers are executed via the dual-port memory, it would be necessary to configure a special memory configuration for a multiprocessor system having a larger number of processors than two, and that would be extremely difficult to accomplish.

SUMMARY OF THE INVENTION

It is an objective of the present invention to overcome the disadvantages of the prior art as set out above, by providing a method and apparatus for data transfer between processing elements whereby a multiprocessor system can be configured in which the amount of time that is required for carrying out data transfers (in addition to the time required for processor operations other than data transfers) can be made very much less than has been possible in the prior art without utilizing special devices such as a dual-port memory.

It is a further objective of the present invention to provide a method and apparatus for data transfer between processing elements whereby data transfer operations can easily be controlled by a program that is being executed by the processor of a processing element.

It is moreover an objective of the present invention to provide a method and apparatus for data transfer between processing elements whereby a multiprocessor system can be configured in which the number of processing elements of the system can be easily expanded.

It is an additional objective of the present invention to provide a method and apparatus for data transfer between processing elements whereby a high-performance multiprocessor system can be implemented.

To achieve the above objectives, according to a first aspect, the present invention provides a method of data transfer for a processing element which is formed of a processor, a memory and a data transfer controller respectively mutually coupled to a data bus, the method comprising:

(a) supplying a transfer command signal to the data transfer controller, for designating that a datum is to be transferred out of the processing element;

(b) concurrent with step (a), supplying the datum to the data bus under the control of the processor; and (c) initiating the transfer of the datum, under the control of the data transfer controller, in response to the transfer command signal.

With the above method of data transfer the datum may be supplied to the data bus while the memory is being accessed by the processor, i.e. while that datum is being written into the memory after having been generated as a processing result by the processor, or while the datum is being read out of the memory to be used by the processor.

Moreover, with the method of the present invention, a program that is executed by the processor may include both instructions for designating memory access operations by the processor which are to be executed concurrently with generation of respective ones of the transfer command signals, and also instructions for designating memory access alone.

According to another aspect, the present invention provides a processing element formed of at least a processor, a memory and a data transfer controller respectively coupled to a data bus and address bus, in which the data transfer controller comprises:

read address registering means for holding a value of memory address in which is stored a datum corresponding to a most recently issued transfer command signal from the processor, and means for updating the address value each time that a transfer command signal is issued by the processor; and status registering means for maintaining a count of a total number of transfer command signals issued by the processor for which respectively corresponding transfer command signal have not yet been initiated by the data transfer controller;

in which, when a transfer command signal is issued by the processor while the data transfer controller is in an internal operating condition whereby initiation of data transfer is currently possible, the data transfer controller initiates the data transfer and advances the address value held in the read address registering means, whereas each time that a transfer command signal is issued by the processor while the data transfer controller is in an internal operating condition in which initiation of data transfer is not possible, the data transfer controller increments the count in the status registering means, and when initiation of data transfer by the data transfer controller subsequently becomes possible and control of the data bus is released by the processor, supplies successive address values from the read address registering means to execute readout from the memory of successive ones of the data for which transfer was designated while transfer initiation was not possible, and in which the data transfer controller advances the address value held in the read address registering means and decrements the count in the status registering means each time that such a memory read access is thus executed.

According to yet another aspect, the present invention provides a multiprocessor system comprising a plurality of processing elements interconnected by a network for mutual interchange of data, each processing element comprising a processor and a memory linked by a data bus, a data transfer controller, a first input/output port coupled between the data transfer controller and the data bus, and a second input/output port coupled between the data transfer controller and the network, in which when a datum is to be transferred from the $i^{th}$ processing element to the $j^{th}$ processing element of the multiprocessor system, the processor of the $i^{th}$ processing element generates a transfer command signal while at the same time executing a memory access operation, the data transfer controller of the $i^{th}$ processing element responds to that transfer command signal by loading the datum into the first input/output port of the $i^{th}$ processing element while the datum is being transferred between the processor and memory of the $i^{th}$ processing element, and the datum is then transferred to the network from the second input/output port of the $i^{th}$b processing element, and in which the data transfer controller of the $j^{th}$ processing element loads the datum into the second input/output port of the $j^{th}$ processing element from the network, and then transfers the datum from the first input/output port of the $j^{th}$ processing element to the memory of the $j^{th}$ processing element to be written therein.

DESCRIPTION OF PREFERRED EMBODIMENTS

Figure 3:
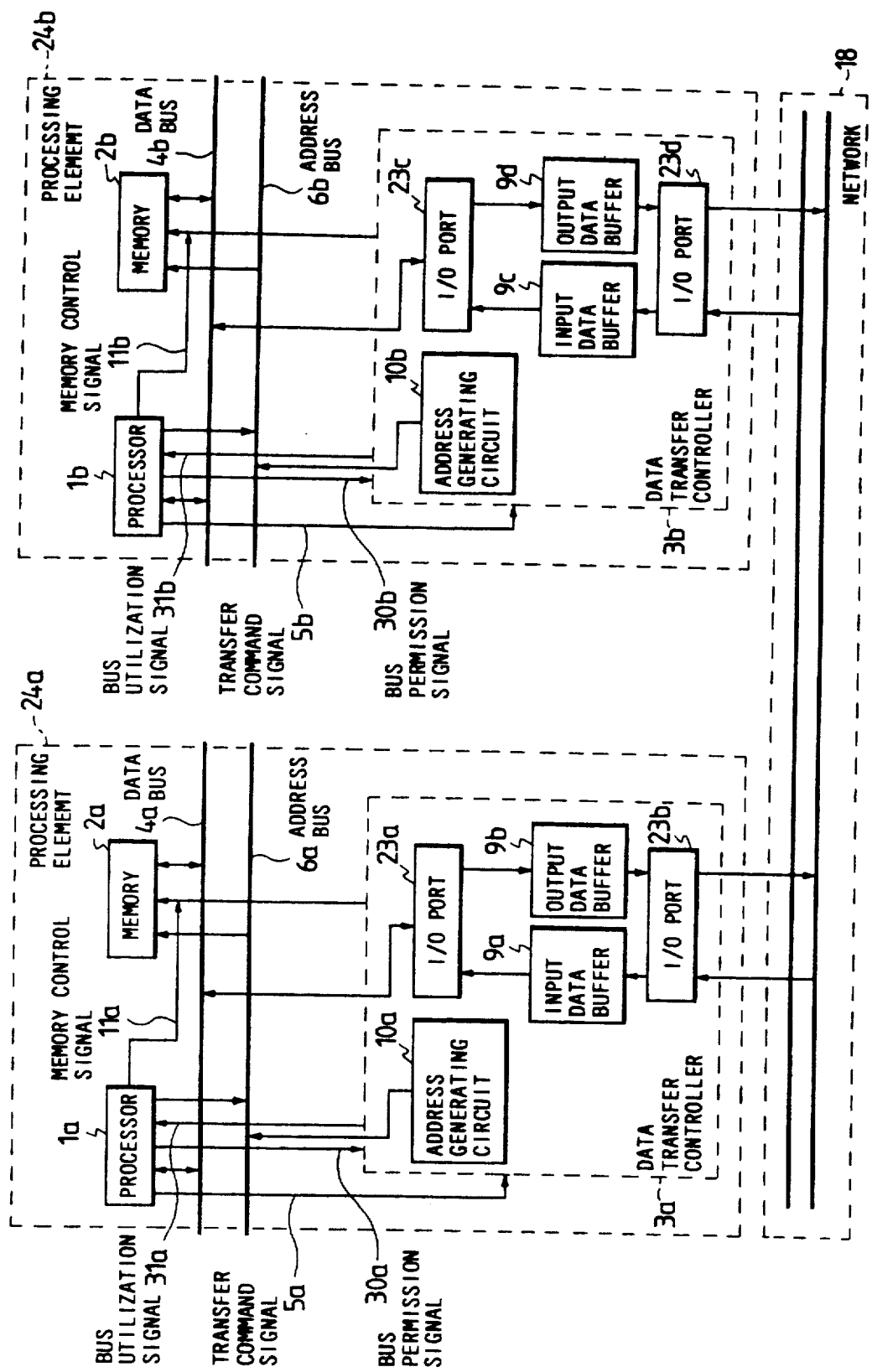
FIG. 3 is a block diagram of a multiprocessor system for implementing a first embodiment of the method of data transfer of the present invention.
Figure 4:
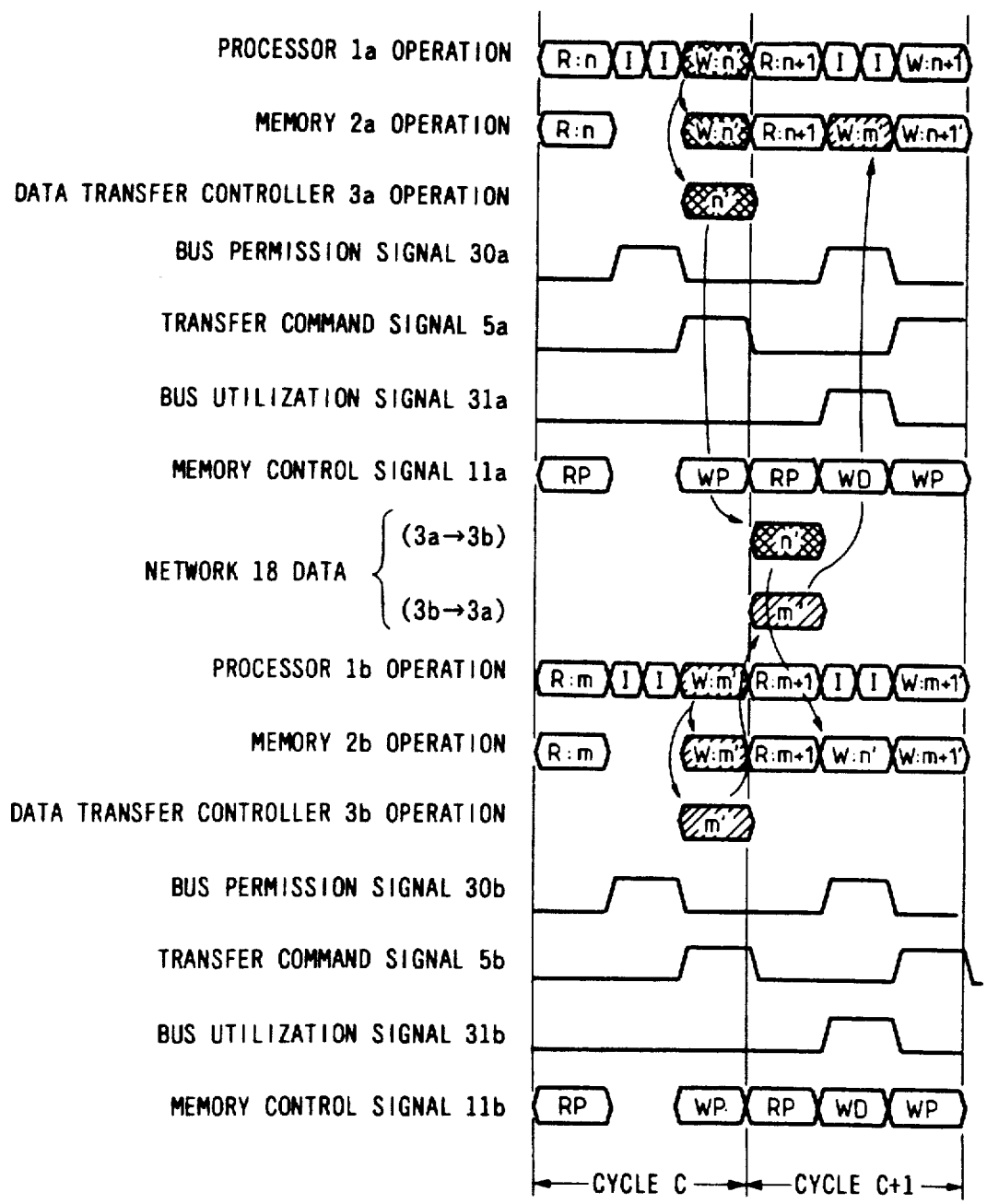
FIG. 4 is a timing diagram showing an example of data interchange in the system of FIG. 3.

FIG. 3 is a block diagram for describing a first embodiment of a method of data transfer according to the present invention, and an apparatus for implementing that method. FIG. 4 is a timing diagram for the operation of that embodiment. In FIG. 3, the processing elements 24a, 24b are respectively formed of processors 1a, 1b, memories 2a, 2b, data transfer controllers 3a, 3b and data buses 4a, 4b and address buses 6a, 6b. 5a, 5b respectively denote transfer command signals of these processing elements 24a, 24b, each of which is asserted by the respective one of the processors 1a, 1b to indicate that a data transfer via the data transfer controller is to be started (more specifically, that data are to be transferred from the data bus of that processing element into the output data buffer of the data transfer controller of that processing element). The data transfer controller 3a includes input data buffer 9a and output data buffer 9b, I/O ports 23a, 23b, and an address generating circuit 10a, while the data transfer controller 3b includes input data buffer 9c and output data buffer 9d, and I/O ports 23c, 23d together with an address generating circuit 10b.

11a, 11b denote respective read/write control signals for the memory 2a and memory 2b. The signal 11a can be generated either by the processor 1a or the data transfer controller 3a, i.e. is produced from respective tri-state output terminals of the processor 1a or the data transfer controller 3a, to designate that a memory read access or write access is to be executed.

30a and 30b denote respective bus permission signals of the processing element 24a, processing element 24b, each of which is asserted when the corresponding internal data bus (4a or 4b) is free, i.e. is not currently being used by the processor (1a or 1b) and can be accessed by the corresponding data transfer controller. (In the following, the "assert" state will be assumed to be the logic 1 level of a signal). 31a, 31b are respective bus utilization signals which indicate that the corresponding internal data bus 4a or 4b is currently being used by the data transfer controller 3a or 3b of that processing element.

6a and 6b denote respective address buses within the processing elements 24a, 24b. Addresses for memory read or write accessing can be sent to each of these address buses from either the processor (1a or 1b) or the data transfer controller (3a or 3b).

In this embodiment, the network 18 has two buses 50, 51, which respectively serve for transferring input data to the I/O port 23b of the processing element 24a (from the processing element 24b or from any other device which may be connected to that bus in the network 18), and for similarly transferring input data to the I/O port 23d of the processing element 24b. Data that are being transferred out of a processing element are temporarily held in the output data buffer 9b or 9d. Similarly, data that are transferred into a processing element are temporarily held in the input data buffer 9a or 9c.

The operation of this embodiment will be described based on the processing element 24a, although similar operations are executed at the same time by the 24b. When the processor 1a accesses the memory 2a (i.e. to read out data to be used in a processing operation, or to write in data resulting from a processing operation), the data which are written or read to or from the memory 2a at that access are also loaded into the output data bus 9b at that time, if a data transfer has been specified for that data. In general, such a designation that a data transfer is to be executed will be generated by the processor as a result of program execution. When such a data transfer is to be executed, the processor 1a asserts the transfer command signal 5a, and in response, the data transfer controller 3a generates control signals whereby the datum, or more specifically the data word, which is then appearing on the data bus 4a is loaded into the output data bus 9b, to be temporarily held until that word can be transferred via the I/O port 23b to the network 18. It can thus be understood that the timing of each data transfer operation, whereby a data word is loaded into the output data bus 9b of the data transfer controller 3a, can be made to coincide in time with a memory access operation by the processor 1a. Thus, each data transfer operation can be completely "hidden" within a processor execution cycle, and within a memory access operation executed by the processor within that cycle. This is the basic advantage of the present invention, which will be made clearer by the following example.

FIG. 4 is a timing diagram showing two successive processor execution cycles, C and C+1. It will be assumed that data words of an array designated as n, n+1, n+2 . . . are being successively read out by the processor 1a from the memory 2a of the processing element 24a and processed by the processor 1a, to obtain successive data results n', n+1', n+2', . . . which are written into the memory 2a by the processor 1a. Similar processing of a array m, m+1, m+2, . . . is being executed at the same time by the processing element 24b, to obtain corresponding results (i.e. data words) m', m+1', m+2'... which are written into the memory 2b by the processor 1b. In addition, as each result is written into the memory 2a of the processing element 24a, it is also transferred to the processing element 24b via the network 18 and written by the data transfer controller 3b into a predetermined address of the memory 2b (that address being specified by the address generating circuit 10b), while at the same time a result produced from the processing element 24b is being transferred to the processing element 24b, to be written by the data transfer controller 3a into a predetermined address of the memory 2a. Thus, steps of reading a data value from the memory 2a, processing that and writing a result obtained by the processor 1a into the memory 2a, and transferring that result to the other processing element, and writing into memory a result which has been transferred from that other processing element, can all be performed within a single execution cycle of the processor 1a, with no additional time being required for executing the data transfer. The same is of course also true for the processing element 24b.

In FIG. 4, cycle C is a processor execution cycle in which the data values n and m are respectively read out of memory and processed in the processing element 24a, processing element 24b respectively, and in which transfer of the corresponding results n', m' to the other processing element is initiated. Cycle c2 is processor execution cycle in which the transferred results n', m' are written into the memories of the processing elements 24a, 24b, respectively, and in which data values n+1, m+1 are processed by the processing elements 24a, 24b, to be then interchanged in the same way as for n and m. In FIG. 4, RP denotes a memory read access operation by a processor 1a or 1b, WP denotes a memory write access operation by a processor 1a or 1b, and WD denotes a memory write access which is executed by a data transfer controller 3a or 3b. R:n denotes "value n is read from memory", while similarly W:n' signifies "n' is written into memory". The operation of the processing element 24a in cycle C is as follows. Firstly, the memory control signal 11a is set in the memory read state, data word n is read out of the memory 2a, and then internal processing of n by the processor 1a begins. This is assumed to take two successive internal processing cycles of the processor 1a (each indicated as I). During that time, the 1a asserts the bus permission signal 30a, indicating that the data bus 4a is now available. The memory control signal 11a is then set in the memory write state by the processor 1a, and the result n' is outputted from the processor 1a to the data bus 4a and written into the memory. At the same time, the processor 1a asserts the transfer command signal 5a, thereby notifying the data transfer controller 3a that the data being written into memory at that time are also to be loaded into the output data bus 9b, for subsequent transfer to the processing element 24b. The data transfer controller 3a then transfers data n' through the I/O port 23a to the output data bus 9b.

In addition, the processing element 24b executes identical operations during cycle C, for the data word m, as shown in FIG. 4, leaving result m' loaded into the output data buffer 9d of the data transfer controller 3b at the end of cycle C. m' and n' are then transferred via the network 18 to the input data buffers 9a and 9c respectively of the processing elements 24a, 24b.

In cycle C+1, the same (read from memory—process—write result into memory) sequence of operations is executed by the processing element 24a for data word n+1, and by the processing element 24b for the data word m+1. However when the processing element 24a begins internal processing, and so asserts the bus permission signal 30a (thereby indicating that the data transfer controller 3a can now execute a memory access), this is detected by the data transfer controller 3a. Assuming that the data transfer controller 3a has the data word m' waiting in the input data buffer 9a to be transferred to the memory 2a, then the data transfer controller 3a now asserts the bus utilization signal 31a, to indicate that it now is controlling the data bus 4a and address bus 6a. The address generating circuit 10a then generates an address for writing the value m' into the memory 2a, the data transfer controller 3a transfers that value via the I/O port 23a to the data bus 4a, and the data transfer controller 3a sets the memory control signal 11a to the "write" state, whereupon the data word that is outputted from the input data bus is written into the memory 2a.

At the same time in cycle C+1, identical operations are being executed by the processing element 24b, for writing the value n' into the memory 2b simultaneously with the writing of m' into the memory 2a.

The bus utilization signal 31a then ceases to be asserted, so that the processor 1a can now gain control of the memory buses, and begin a memory write access for writing the result n+1' into the memory 2a. Similarly, m+1' is at the same time written into the memory 2b by the processor 1b of the processing element 24b. The above sequence of operations are then repeated, to initiate data transfer of the new result values n+1' and m+1', since the transfer command signals 5a and 5b are asserted when the respective processors write these into the respective memories 2a, 2b.

It can thus be understood from the above that the result data n' or m' are transferred to the corresponding output data buffer 9b or 9d at the same time as these are being written into memory by the processor. That enables a substantially increased performance to be achieved for such a multiprocessor system, by comparison with prior art methods of data transfer. That is, with this embodiment, each time a data word that has been derived by an internal processing operation by a processor of one processing element of the multiprocessor system is then written into the memory of that system, transfer of that word to the second processing element of the multiprocessor system is initiated at the same time, while simultaneously with that, transfer of a data word produced by a processing operation of the second processing element to the first processing element is initiated when that word is written into the memory of the second processing element. All of these operations are completed within a single processor execution cycle, e.g. cycle C1 or C+1 in FIG. 4. Each data transfer operation is initiated (i.e. by loading the data to be transferred into the output data buffer of the data transfer controller) at the same time that the data are written into memory by the processing, rather than waiting until the internal data bus becomes free (e.g. during the succeeding processor execution cycle) to read out the data and initiate the data transfer operation, as is necessary with the first prior art example described above.

Although such a method of data transfer between two processing elements of a multiprocessor system is basically simple, it has not been used or described in the prior art, and has significant advantages. It will be apparent that such a system will have an inherently higher performance than a prior art system in which, in order to execute a data transfer operation, a memory read access (e.g. a DMA access, while the processor is in an internal execution cycle) is performed to read out the desired data in a processor execution cycle subsequent to that in which the data were generated. With the first embodiment of the present invention described above, the data to be transferred are sent to the data transfer controller within the same processor execution cycle in which they were generated. Thus, the interval in which the data buses of a processing element are free during the succeeding processor execution cycle (i.e. while the processor is executing internal processing) can be used to write into the memory a data word that has been transferred from another processing element, as is done in the example of FIG. 4. It is thus possible to achieve substantially enhanced performance.

It is necessary to use the input and output data buffers (9a, 9b and 9c, 9d) in the processing elements in order to enable data to be transferred to/from the network 18 at the bit rate of that network, since in general, the bit rate of the network 18 will be substantially lower than the internal bit rates of the processing elements 24a, 24b. The capacity required for each of these data buffers will depend upon the configuration of the particular multiprocessor system, manufacturing cost considerations, etc. However in general, assuming for example that the data rate of the internal bus (4a, 4b) of each processing element is ten times that of the network 18, a capacity of approximately 8 to 16 words for each data bus will be satisfactory.

It should be noted that although the above description describes a type of system operation in which the only type of memory access executed by each data transfer controller is a write access (to store data that have been transferred from the other processing element), it may occasionally be necessary with the method of the present invention to execute a memory read access operation by a data transfer controller. This will be required if a condition has occurred whereby there has been a request to transfer data (i.e. the transfer command signal 5a has been asserted, indicating that a word has to be loaded into the output data buffer 9b for transfer out of the processing element), but in which it is not possible to load the data into the output data buffer, due to the output data buffer being full. In such a case, it will be necessary to subsequently execute a memory read access by the data transfer controller, when the "buffer full" condition has ended and the internal buses of the processing element become available to the data transfer controller, in order to then initiate transfer of each data word that has been missed. With the prior art example of FIG. 1, each data transfer controller contains a single address register, for use in reading out from memory the data which are to be transferred out from the processing element or in writing into memory data which have been transferred into the processing element. However with the present invention it is necessary to provide in each processing element, in addition a write address register for use in writing into memory data which have been transferred into the processing element, a read address register for use, when necessary, in reading out from memory data which have been previously designated for transfer (i.e. by the transfer command signal being asserted while the data were being written into or read out from memory by the processor of that processing element) but which could not be transferred at that time due to the internal operating condition of the data transfer controller, i.e. due to the output data buffer being full. That is to say with the present invention, since normally each data transfer operation is initiated by the processor of a processing element independently of the data transfer controller, it is necessary to ensure for the data transfer controller to keep a record of successive memory addresses which have been accessed by the processor together with a transfer command signal being issued, so that the data transfer controller itself can access the memory whenever it has been impossible to initiate a data transfer at the time of a processor memory access operation. A circuit and method for achieving this will be described in detail hereinafter.

The above description of the first embodiment has assumed that data transfer occurs only between the processing elements 24a, 24b. However it is of course also possible to configure the multiprocessor system such that various devices connected in the network 18 (e.g. a keyboard, disc drive units, etc) can transfer data to/from the processing elements.

Figure 1:
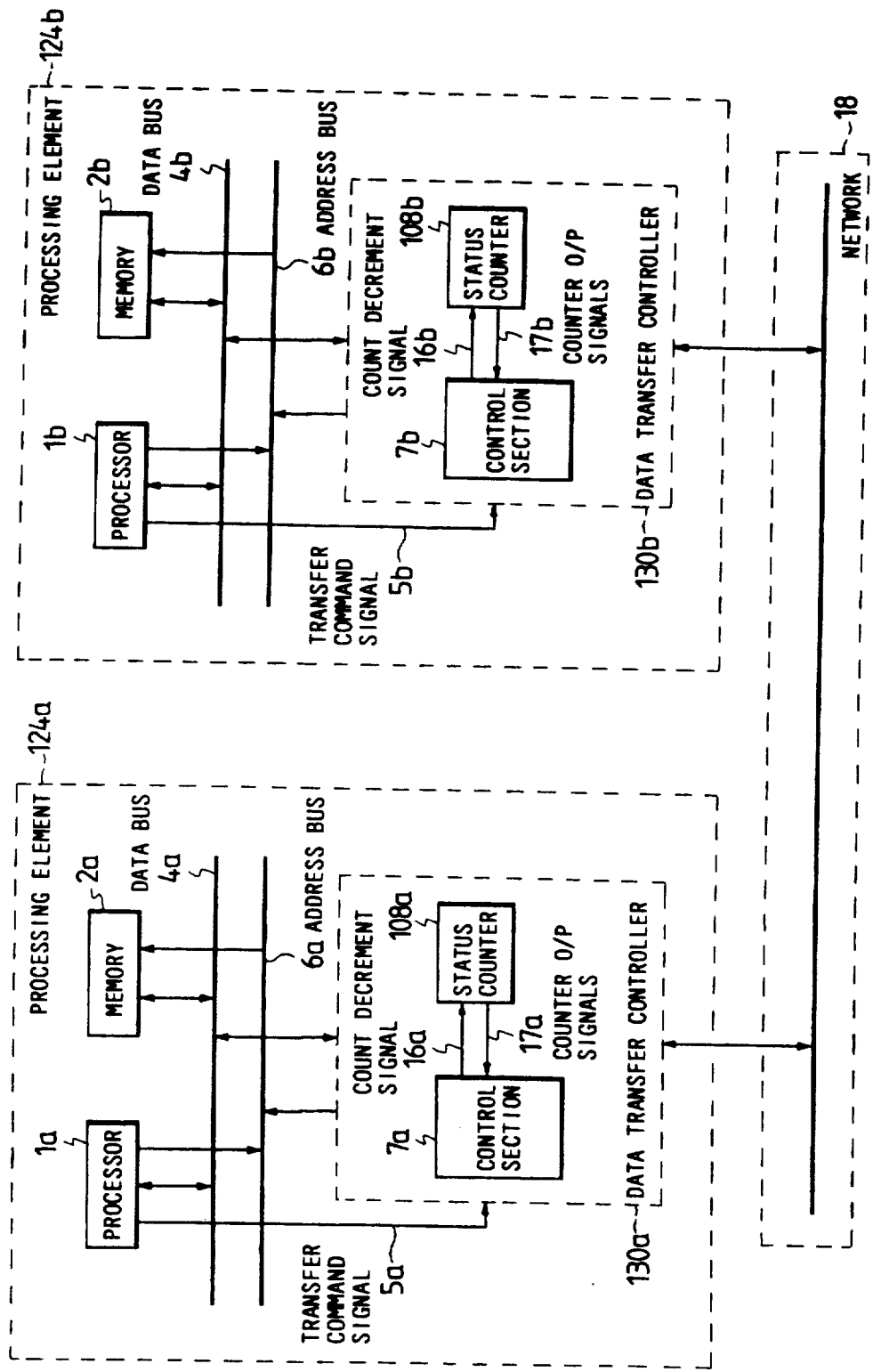
FIG. 1 is a block diagram of a multiprocessor system utilizing a prior art method of data transfer.
Figure 2:
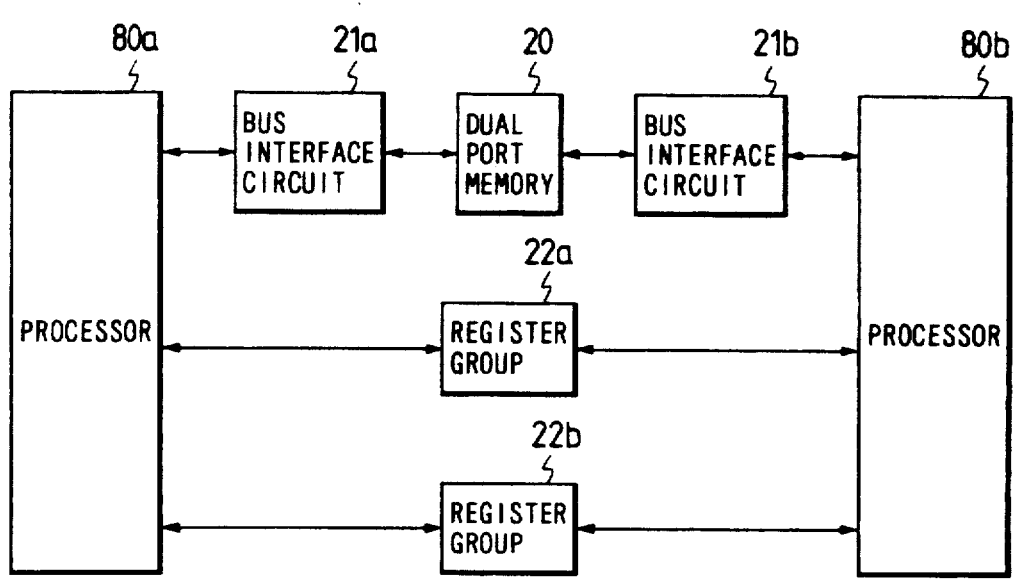
FIG. 2 is a block diagram of a second example of a multiprocessor system utilizing a prior art method of data transfer.
Figure 5A:
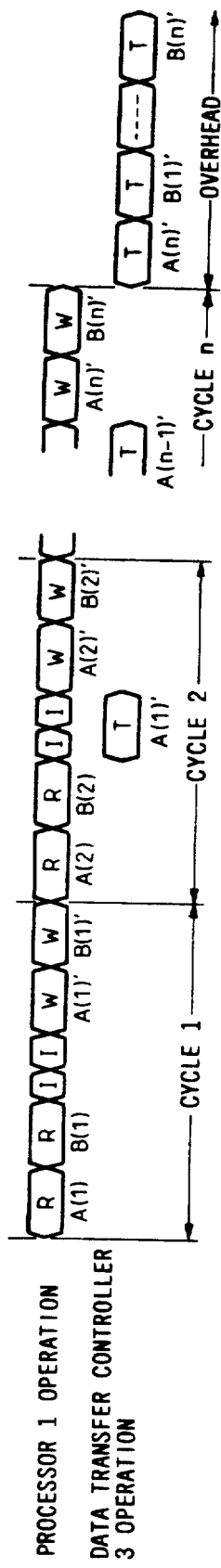
FIGS. 5A and 5B are timing diagrams for comparing the method of the present invention with the prior art method of FIG. 1.
Figure 5B:
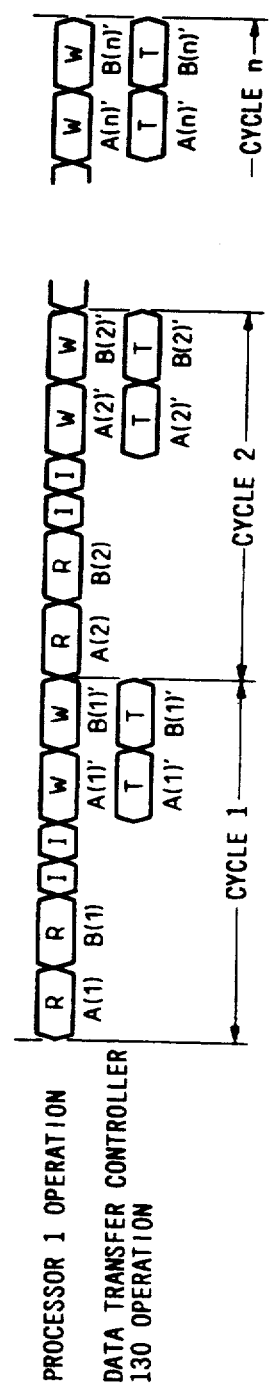

FIGS. 5A, 5B are diagrams for further describing the advantages of the present invention by comparison with a prior art multiprocessor system such as that of FIG. 1. It is assumed that two arrays of data words, A(1) to A(n) and B(1) to B(n,) are to be processed by a processing element, using one value from each of the arrays in each processing operation, and that the results obtained from each processing operation will consist of a pair of values, i.e. with the result values A(1)', B(1)' being obtained from processing of A(1), B(1), and so on, and that these result values have to be transferred out of the processing element to an external network. In FIG. 5A, R denotes a memory read cycle, W denotes a memory write cycle, I denotes a processor internal operation cycle (e.g. inter-register computations executed within the processor of the processing element), and T denotes a data transfer operation executed by the data transfer controller of the processing element.

FIG. 5A shows the corresponding timing diagram for the case of such processing being executed by the prior art example of FIG. 1. In the first processor execution cycle 1, the data words A(1), B(1) are successive read out from the memory of the processing element, processing takes place during two successive processor internal operating cycle cycles, and the resultant values A(1)', B(1)' are then written into the memory in two successive memory write cycles. In the next processor execution cycle 2, similar processing is executed for the data words A(2), B(2). However the result A(1)' that was obtained during the preceding processor execution cycle 1 is read out from the memory during the processor internal operating cycle cycles, i.e. while the internal buses of the processing element are not being accessed by the processor, a memory read operation is executed by the data transfer controller. Due to the fact that each processor internal operating cycle I has only half the duration of a memory read or write cycle R or W, it is only possible to read out one of the two values which were derived during the preceding processor execution cycle 1. It can thus be understood that upon completion of n processor execution cycles, only the data words A(1)' to A(n−1)' will have been transferred out of the processing element, so that the remaining values A(n)' and B(1)' to B(n)' must then be successively read out of the processing element memory and sent to the network or external device.

FIG. 5B shows the corresponding processing of two data value arrays by a processing element having a configuration in accordance with the present invention, e.g. that of processing element 24a of FIG. 3 above. In this case, during the processor execution cycle 1, the values A(1)', B(1)' are transferred successively to the output data buffer of the processing element, during the same memory write cycles in which these values are respectively written into the memory of the processing element. Thus, the data results A(1)', B(1)' obtained in processor execution cycle 1 can be transferred (i.e. to the output data buffer) during the same processor internal operating cycle in which they are generated, and without requiring that the duration of the processor internal operating cycle be extended in order to enable that data transfer to take place. This is also true for each of the succeeding processor execution cycles. It can thus be understood that all processing and data transfer operations can be completed within n processor execution cycles, so that in this example, by comparison with the method of the present invention, the prior art system of FIG. 1 has an overhead whose duration is equal to (n+1) memory access cycles. The present invention can thus provide a greatly increased level of performance in this case also, as well as for the case of data interchange between processor elements as described above referring to FIG. 4.

Thus it can be understood that with the method of the present invention, it is normally not necessary for the data transfer controller to execute a memory read operation (i.e. while the processor is busy with an internal operating cycle) in order to begin a data transfer. This is very important in attaining high performance for a multiprocessor system in which the rate at which data transfer operations occurs is extremely high.

The above description has been given for an example in which each result obtained by an internal processor operation in each processing element is immediately transferred to the other processing element, in a simultaneous mutual data interchange. However the invention, and in particular the embodiment of FIG. 3, is not limited to such a type of data transfer. For example, it is also possible to transfer data words (e.g. n, n+1, .. and m, m+1, ... ) that are read out from memory by a processor 1a or 1b, to the other processing element. In that case, if a simultaneous data interchange between the processing elements of FIG. 3 takes place as in the example of FIG. 4, then for example when the word n is read out from the memory 2a by the processor 1a of the processing element 24a (R:n), the transfer command signal 5a would be asserted, and that word would therefore at the same time be loaded into the output data buffer 9b of the data transfer controller 3a, to be transferred to the processing element 24b. An identical operation would occur in the processing element 24b at the same time, to begin transfer of the word m to the processing element 24a, when that word is read out from the memory 2b by the processor 1b. In that case, during cycle C+1 of FIG. 4, words m and n would be written into the memories 2a and 2b respectively during the processor execution cycle interval, rather than the results m' and n'.

As mentioned above, it is possible with the method of the present invention for the program that is being executed by each processing element of the multiprocessor system to determine the points during that program execution at which data transfer commands are issued, i.e. the points at which the transfer command signal is to be asserted. This will be described referring to the timing diagram of FIG. 6. Here, C'0, C'1, C'2 .... denote respective processor clock cycles, with two successive ones of these cycles being required to execute a memory read or write access cycle (i.e. with processor execution cycle C in the example of FIG. 4 consisting of six of these processor clock cycles) and with a simple internal processor operation such as inter-register addition occupying one of these cycles. The processor of a processing element of a multiprocessor system according to the present invention executes a program which can include the machine language instructions shown, i.e. a LD instruction (signifying "read a word from memory, and load into a processor internal register"), LDDTC (same as LD, but also "load that word into the data transfer controller"), ADD, ST (store the register contents, i.e. result, into memory), and STDTC (same as ST, but also "load the register contents into the data transfer controller"). Thus when a LDDTC instruction is executed, the transfer command signal is asserted while the processor (e.g. 1a) is executing a read access of the memory (2a). Similarly when a STDTC instruction is executed, the transfer command signal is asserted while the processor is executing a write access of the memory. That is to say, in order to assert the transfer command signal at the point in the program execution when a particular word that is to be used in (or produced as a result of) a processor operation, in order to transfer that word out of the processing element at the same time as the word is being read out (or written into) the processing element memory, it is only necessary to insert a LDDTC (or STDTC) instruction in the program at that point. Thus, data transfer operations can be easily controlled at the program level.

During cycle C4, in which the processor is executing internal processing, the bus permission signal 30a is asserted, and the output terminal of the processor which produces the memory control signal 11a is set in the high impedance state, so that the data transfer controller can take control of the buses (4a, 6a) to access the memory, e.g. to write in a data word transferred from another processing element. If in fact the data transfer controller were to begin a memory access during cycle C4, then as described above the bus utilization signal 31a will be asserted, so that the next memory access by the processor will be postponed until the buses are released by the data transfer controller, e.g. until the end of processor clock cycle C5 in this example.

Although in the above example it is assumed that two processor clock cycles (C2, C3 or C7, C8) are required to load a word into the output data buffer of the data transfer controller, this will not necessarily be the case, and the actual time required will depend upon factors such as the particular configuration of the data transfer controller.

It should be noted that when program instructions are used in this way by the processing elements of a multiprocessor system, e.g. to ensure that a processing result will be almost immediately transferred from the processing element as the same time that it is being written into memory, overall performance of the multiprocessor system is inherently improved by comparison with the prior art. This is because each result is made more rapidly available to the other processing element or processing elements of the multiprocessor system, by comparison with the case in which prior art processing elements of the form shown in FIG. 1 are used, in which each result is not transferred until a point during the succeeding processor execution cycle (as illustrated in FIG. 5A). Moreover when a data word is to be transferred out of the processing element before being processed, this transfer can take place at the same time that the word is being read out from memory to be processed.

Figure 6:
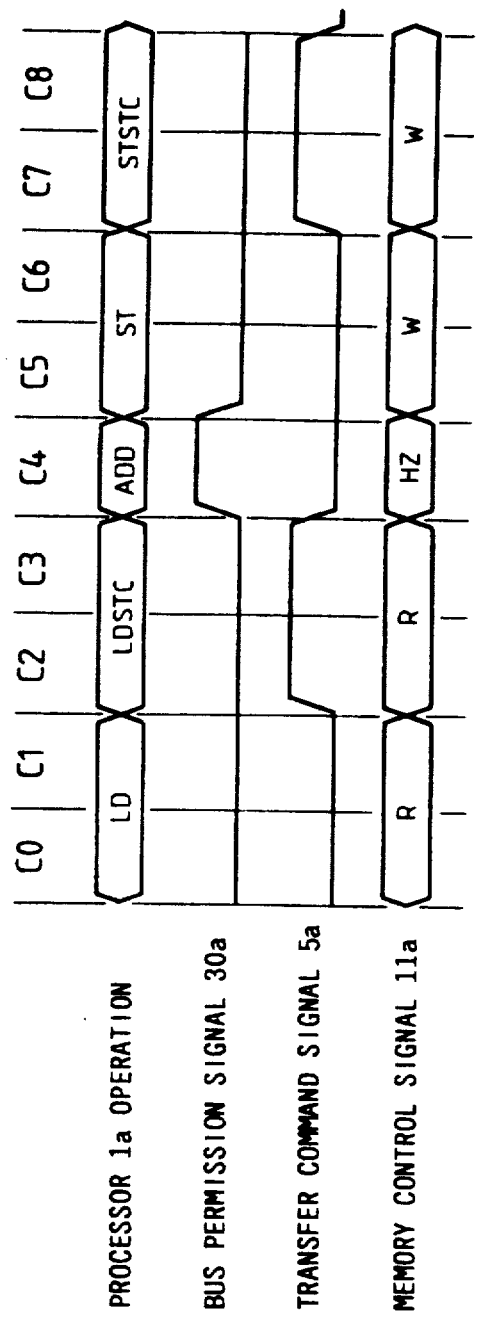
FIG. 6 shows examples of utilizing machine language instructions to selectively generate data transfer commands together with memory accesses by a processor of a processing element.
Figure 7:
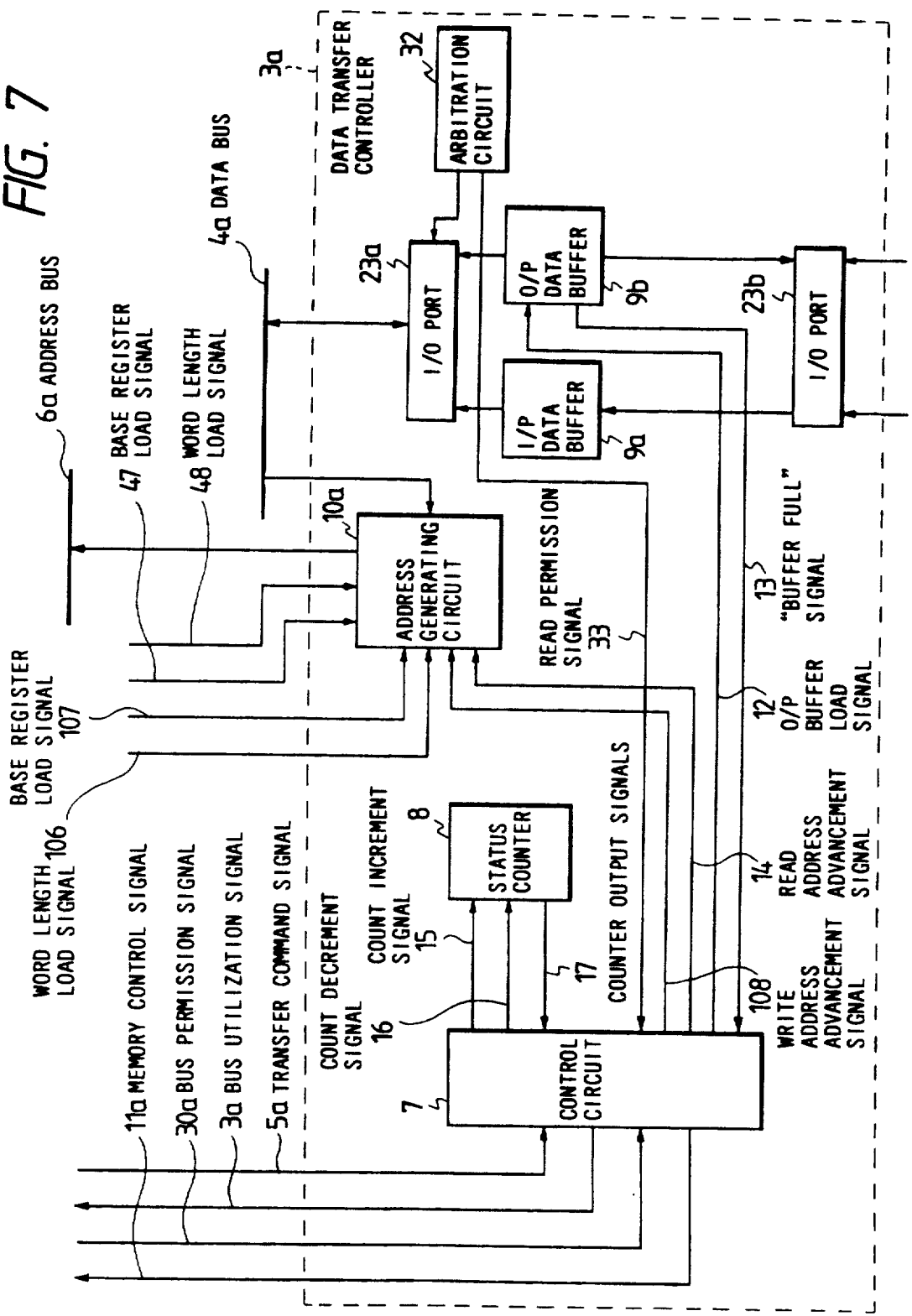
FIGS. 7 and 8 illustrate the internal configuration of a data transfer controller in FIG. 3.
Figure 8:
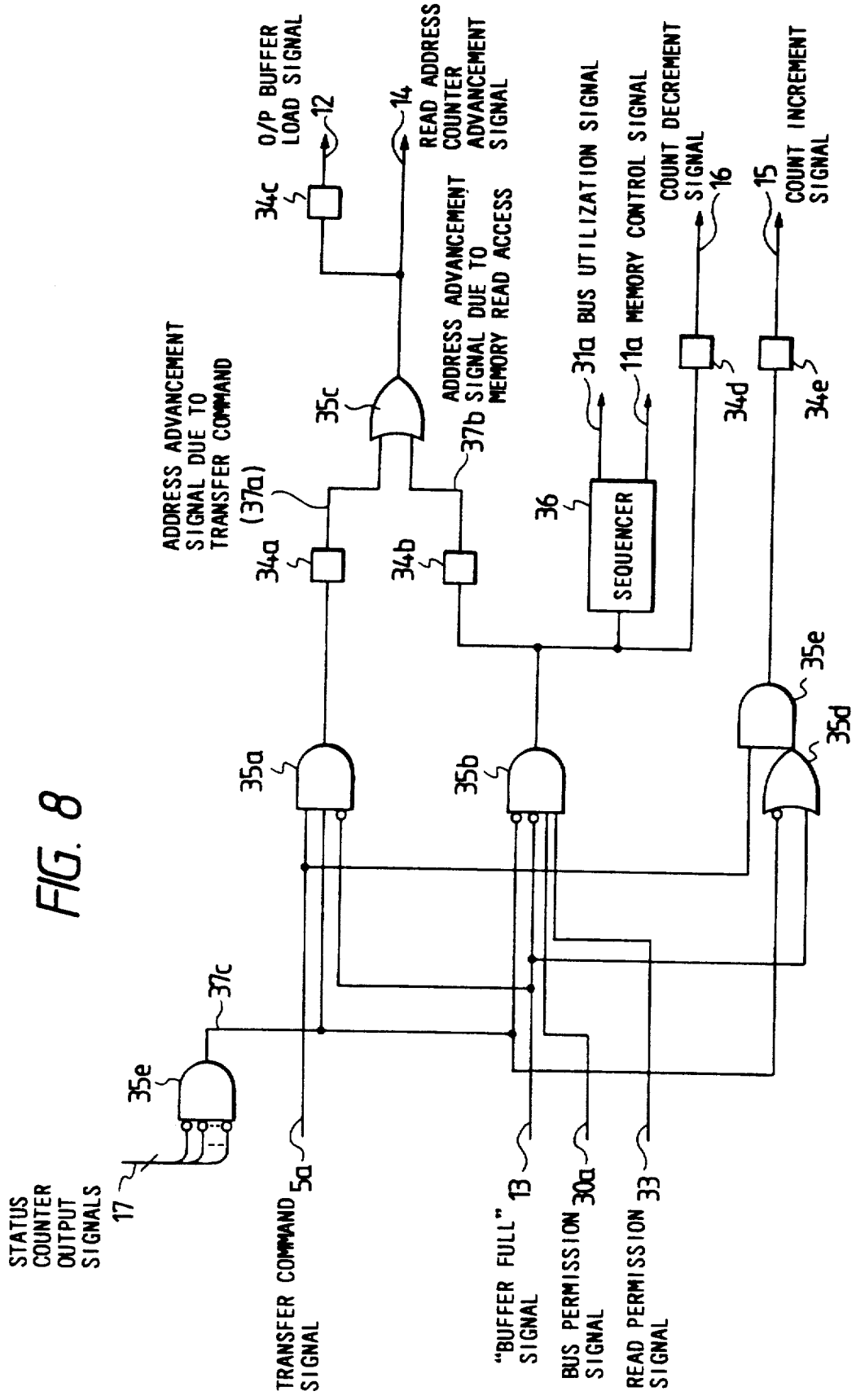

An example of the internal configuration of the data transfer controller 3a of the processing element 24a (which is of course identical to the data transfer controller 3b of the processing element 24b) will be described in the following. FIG. 7 is a block diagram showing the general configuration of the data transfer controller 3a, FIG. 8 is a circuit diagram of a control circuit 7 within the data transfer controller, and the appended Table 1 summarizes the basic operations of the data transfer controller. In FIGS. 7 and 8, 6a and 4a denote the internal data and address buses respectively of the processing element, 5a is a transfer command signal, 7 is the control circuit, 8 is a status counter (for maintaining a count value representing the current data transfer status, i.e. the number of data transfer commands which have not yet been responded to), 9a, 9b are the input data buffer and output data buffer respectively, 10a is the address generating circuit, 11a is the memory control signal, 12 denotes an output buffer load signal (for executing loading of a word from the address bus 6a into the output data bus 9b), 13 is a "buffer full" signal (for indicating a condition in which a data transfer cannot be initiated, since the output data bus 9b is currently filled with data), 14 denotes a read address advancement signal, 15 denotes a count increment signal (for successively incrementing the contents of the status counter 8), 16 is a count decrement signal (for successively decrementing the contents of the status counter 8), 17 denotes a set of counter output signals which in combination represent a count value held in the status counter 8, 23a and 23b are I/O (input/output) ports, 30a denotes the bus permission signal, 31a is the bus utilization signal, 32 denotes an arbitration circuit for selectively enabling a write or a read memory access operation by the data transfer controller, 33 is a read permission signal generated by the arbitration circuit 32 when memory read access by the data transfer controller is possible, 34a, 34b, 34c, 34d and 34e are respective latches whose operations are controlled by timing signals (not shown in the drawings) such as to provide appropriate amounts of delay, and 36 is a sequencer circuit for generating signals to execute a memory read access operation by the data transfer controller. 37a denotes a first address advancement signal for advancing an address value held in a read address counter contained in the address generating circuit 10a, which is generated as a result of the transfer command signal 5a being asserted, while signal 37b is a second address advancement signal for advancing an address value held in a read address counter of the address generating circuit 10a, which is generated as a result of a memory read access being executed by the data transfer controller, as described hereinafter.

The output signals 17 from the status counter 8 are supplied to respective negation (i.e. inverting) inputs of an AND gate 35e, to obtain an output signal 37c which will be at the 1 state only when the status counter 8 contain the (initial value) count of zero. The transfer command signal 5a and signal 37c are inputted to an AND gate 35a, while the "buffer full" signal 13 is applied to a negation input of gate 35a. The signal 37c and the "buffer full" signal 13 are applied to negation inputs of AND gate 35b, while the bus permission signal 30a and read permission signal 33 are applied to respective inputs of gate 35b. The transfer command signal 5a is applied to one input of an AND gate 35e, while the "buffer full" signal 13 and the signal 37c are applied to a normal input and a negation input of an OR gate 35d whose output is supplied to the other input of the gate 35e.

It is possible that a condition can occur in which signals for initiating a memory read access and a memory write access by the data transfer controller are generated simultaneously. In order to avoid conflicts in such a case, the arbitration circuit 32 sets the read permission signal 33 to the 1 state when a data read access of the memory 2a by the data transfer controller is permissible, and otherwise holds signal 33 at the 0 state.

Signals 107 and 47 are used to load respective base address values into the write address counter and read address counter (described hereinafter) of the address generating circuit 10a, i.e. the starting address (for writing into the memory 2a) of a block of data that are to be transferred into the processing element from the network 18, and the starting address (for reading data out of the memory 2a) of a block of data that are to be transferred out of the processing element to the network 18.

Normally, the count value held in the status counter 8 is a predetermined initial value, which will be assumed to be zero. In that condition, the output signal 37c from AND gate 35e is at the logic 1 state. If the count value in the status counter 8 is greater than zero, then signal 37c is at the logic 0 state. If the output data bus 9b of the data transfer controller is full, the "buffer full" signal 13 goes to the 1 state, and otherwise it is in the 0 state. Thus, if the transfer command signal 5a is asserted when the status counter 8 contains the count value of zero, and the output data bus 9b is not full, the output from AND gate 35a goes to the 1 state, whereby the address advancement signal 37a is asserted, so that the output buffer load signal 12 is asserted (thereby initiating transfer of data that are currently appearing on the data bus 4a), and in addition the address advancement signal 14 is asserted to advance the read address counter within the address generating circuit 10a.

If on the other hand the transfer command signal 5a is asserted when the status counter 8 contains the count value of zero but the output data bus 9b is full, so that a data transfer cannot be initiated at that time, then the output from gate 35a remains at the 0 level, but the output from the gate pair 35d goes to the 1 level. Thus, the count increment signal 15 is asserted, to thereby bring the contents of the status counter 8 to 1. Thereafter, following termination of the "output data buffer full" condition, when the data bus and address bus of the processing element are released by the processor 1a, so that the bus permission signal 30a is asserted, then if at that time the read permission signal 33 is asserted, since signal 37c will now be at the 1 level, the output from AND gate 35b will go to the 1 level. The address advancement signal 37b is thereby asserted, so that the read address counter of the address generating circuit 10a will be advanced, and the sequencer 36 is set in operation, to thereby execute a memory access operation for reading out the memory (2a) address containing the first data word for which transfer was designated after the buffer full condition started. Since the signal 37b also results in the output buffer load signal 12 being asserted, that word is then loaded into the output data bus 9b. In addition, the address advancement signal 14 is asserted. This is necessary, in order to ensure that the contents of the read address counter will always contain the memory address of the next word that has to be transferred, irrespective of whether that transfer will be the result of a direct command (i.e. being concurrent with the transfer command signal 5a being asserted) or the result of another memory read access by the data transfer controller which occurs immediately following that described above.

Figure 9:
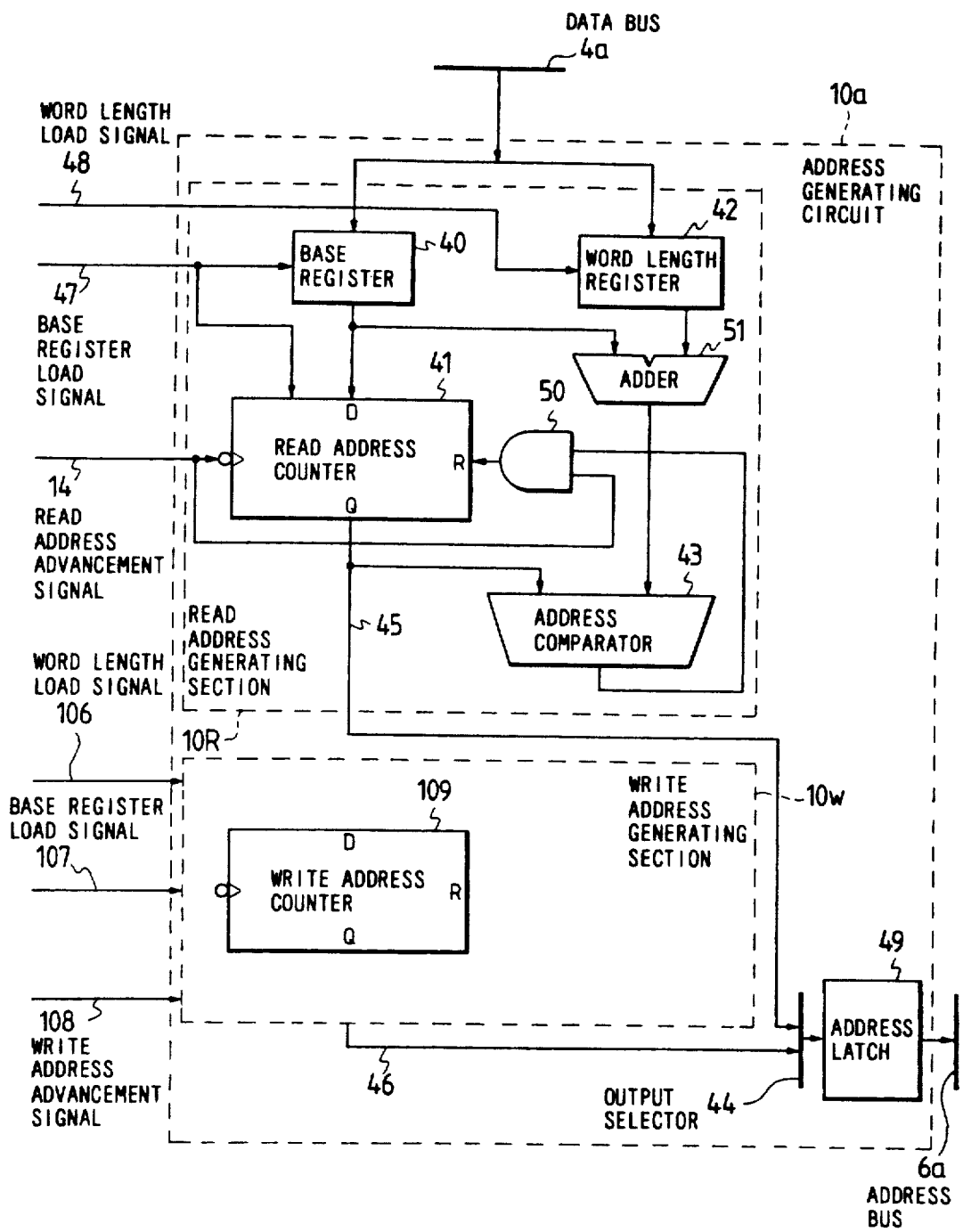
FIG. 9 shows the internal configuration of an address generating circuit in the data transfer controller.

The above operation will be made clearer by the following example given in FIG. 10, which will be described referring to FIG. 9 in addition to FIGS. 7 and 8. FIG. 9 shows details of the internal configuration of the address generating circuit 10a of the processing element 24a. This essentially comprises a read address generating section 10R and a write address generating section 10W, which contain respective address counters i.e. the read address counter 41 and the write address counter 109. In addition the read address generating section 10R includes a base register 40 for and a word length register 42, together with an adder 51, an address comparator 43 and an AND gate 50. The write address generating section 10W includes corresponding components, which are omitted from FIG. 9 for simplicity of description. When a block of data words are to be transferred out of the processing element, the processor 1a first sends to the data bus 4a a value representing the total number of words that will be transferred (that number being referred to as the word length), and asserts the word length load signal 48 to thereby load that number into the word length register 42. In addition, also prior to beginning transfer of these words, the processor sends to the 4a a value representing the base address of that block, i.e. the address in the memory 2a of the first word of the block, and asserts the base register load signal 47 to thereby load that address into the base register 40 and also into the read address counter 41 as the starting address. If the data transfer is to be executed with simultaneous writing in of each of these words to the memory 2a (as in the example of FIG. 4 above, e.g. when the STSTC machine language instruction shown in FIG. 6 is to be utilized to specify each data transfer), then the base address will be the first of a block of addresses that are reserved for writing in these words, as they will be successively derived by the processor. If on the other hand the data transfer is to be executed with simultaneous reading out of these words, which have already been written into memory (e.g. when the LDSTC instruction in FIG. 4 is to be used to specify each data transfer), then the base address that is loaded into the base register 40 prior to beginning transfer of the block of data will be the initial address into which these data have already been written. During transferring of successive words of that block out of the processing element, the address advancement signal 14 is asserted as described hereinabove referring to FIG. 8, each time that a data transfer is actually initiated in response to the transfer command signal 5a being asserted (i.e. each time that a new word is loaded into the output data bus 9b). As a result, the read address counter 41 will always hold the address in the memory 2a of the next word that is to be transferred out of the processing element, irrespective of whether or not the transferring operation is temporarily halted due to an "output buffer full" condition.

When the final word of the block of data has been transferred, the output from the adder 51 (i.e. the sum of the word length and the base address values) will become identical to the output from the read address counter 41, so that the output of the address comparator 43 will go to the 1 state. Thus the next time the address advancement signal 14 is asserted, the output of the AND gate 50 will go to the H level, thereby resetting the read address counter 41.

If data are to be transferred into the processing element 24a from the network 18, then the word length of the block of data that are to be transferred, and the base address of the memory 2a into which these data are to be written, are loaded into the write address generating section 10W in a similar manner to that described above for the read address generating section 10R (by means of the word length signal 108 and base register load signal 107), so that detailed description will be omitted. Each time that a word is transferred from the input data bus and written into the memory 2a, the write address advancement signal 108 is asserted, to thereby advance the address value held in the write address counter 109 of the write address generating section 10W.

Depending on whether a memory read or write operation is to be executed by the data transfer controller, the address output from the read address counter 41 or from the write address counter 109 is selected by an output selector 44 (under the control of the bus permission signal 30a) and supplied to an address latch 49, to be supplied to the address bus 6a.

Figure 10:
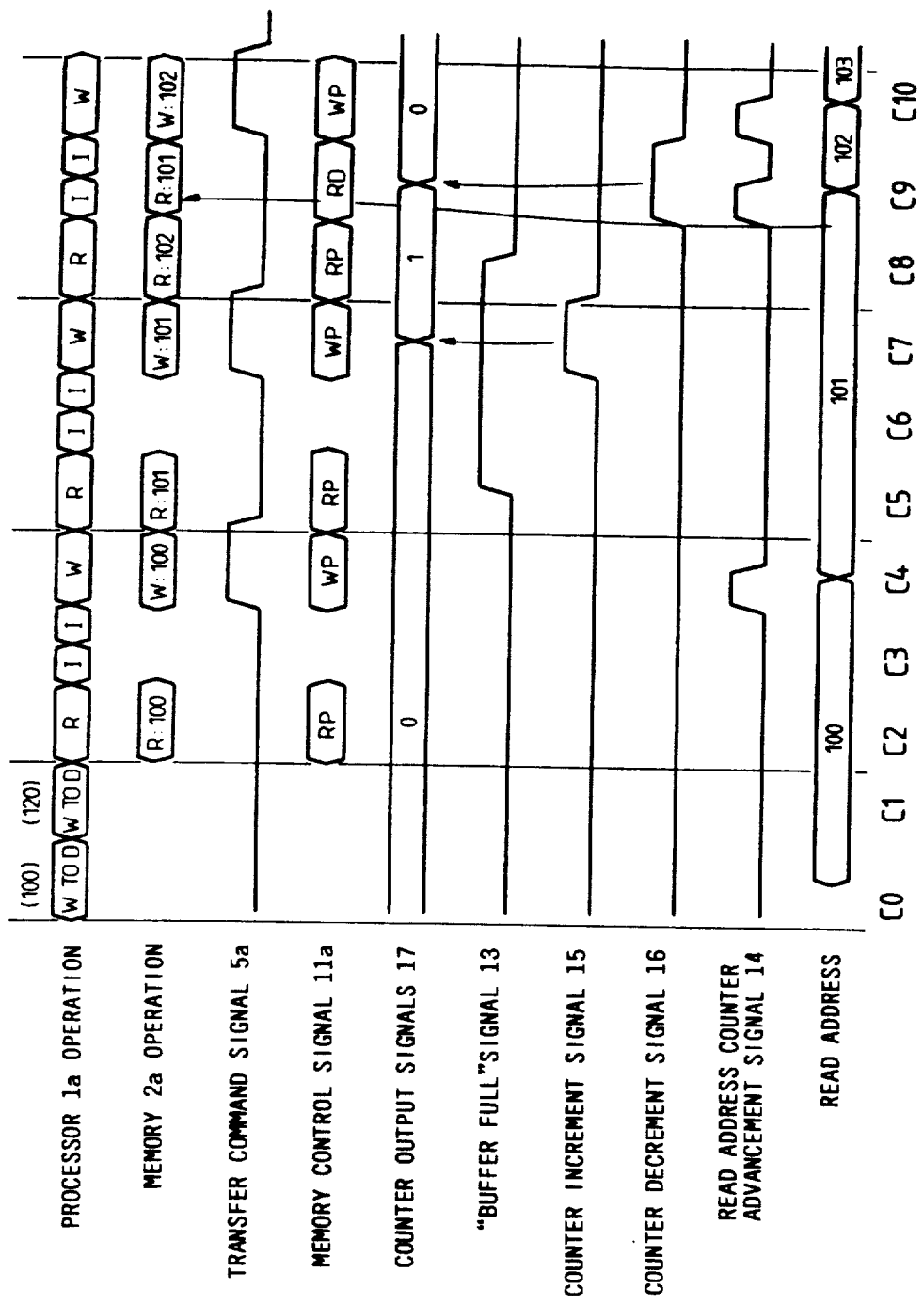
FIG. 10 is a timing diagram for illustrating the operation of the controller when an "output buffer full" condition occurs during data transfer.

The operation of the example shown in the timing diagram of FIG. 10 is as follows. In FIG. 10, C0, C1 etc designate respective cycles, referred to in the following as access cycles, each of which corresponds to one memory access (read or write) operation or to two successive processor internal operating cycles. Each memory read access is designated as R, and a write access as W, while I denotes a processor internal operating cycle. RP denotes a memory read access that is executed by the processor 1a, WP a read access by the processor, and RD a read access that is executed by the data transfer controller. It is assumed that successive words of a block of data stored at addresses beginning at address 100 are to be read out and processed, and the respective results written back into the original memory addresses. It is also assumed that successive data words which will be transferred into the processing element 24a during these processing operations are to be written into a set of addresses of the memory 2a which begin at address 120 (however for simplicity of description, the operations for writing in these transferred data to the memory 2a are omitted from the diagram, since these will be apparent from FIG. 4 described above). Thus, firstly (in cycles C0, C1) the base address values are loaded into the respective address counters of the read address generating section 10R and write address generating section 10W by the processor, by asserting the signals 47, 48 107, 108 at times when the corresponding data have been read out from memory and supplied to the data bus 4a. Next, in cycle C2, the word in address 100 of the memory 2a is read out by the processor 1a (the memory control signal 11a is set to the "read" level), processed in cycle C3. At this time, the status counter 8 contains its initial value of zero, as indicated by the counter output signals 17. In cycle C4, the processor writes the result obtained back into the address 100, and at the same time asserts the transfer command signal 5a. In response, the control circuit 7 of the data transfer controller 3a asserts the address advancement signal 14 (thereby incrementing the address value in the read address counter 41 of the read address generating section 10R to 101), and also the output buffer load signal 12, so that the word that is written into the memory 2a at that time is also simultaneously loaded into the output data bus 9b.

Next, in cycle C5, the processor reads the next word out of memory address 101, processes that, and writes the result back into address 101 in cycle C7. However during cycle C5 the "buffer full" signal 13 begins to be asserted, so that it is not possible for a data transfer to be initiated by the data transfer controller 3a in response to the transfer command signal 5a being asserted in cycle C7. Hence, the count increment signal 15 is asserted, so that the count in the status counter 8 goes to 1, and hence signal 37c (in FIG. 8) goes to the 0 state. As a result, the contents of the read address counter 41 of the read address generating section 10R are held unchanged at 101, although the address counter within the processor now is advanced to 102. Om cycle C8, the processor reads out the contents of address 102, and processes these. During cycle C8, the "buffer full" signal 13 returns to the 0 state. Thus, (assuming the read permission signal 33 is at the 1 state), output from AND gate 35b in FIG. 8 will go to the 1 state during cycle C9. Hence, a memory read access is executed by the data transfer controller in cycle C9, using the address value 101 (i.e. the address of the first word for which transfer was previously specified by the transfer command signal 5a being asserted, but for which data transfer could not be initiated at that time). The output buffer load signal 12 and address advancement signal 14 are also thereby asserted, to advance the read address counter 41 and to load the word thus read out from memory into the output data bus 9b. In addition, the count decrement signal 16 is asserted, to thereby return the contents of the status counter 8 to the initial value of zero, as represented by the counter output signals 17.

Next, in cycle c9, the processor writes the processing result into address 102, while at the same time, (since the output signal from gate 35A is now asserted) the output buffer load signal 12 is asserted to load that processing result into the output data bus 9b at the same time, while in addition the address advancement signal 14 is asserted, to thereby advance the address value held in the read address counter 41 to 103.

The above example has been described for the case in which delay of the data transfer of only a single word has occurred, due to the "buffer full" condition. However even if that condition were to continue for a longer duration than that shown in FIG. 10, the circuit would function correctly. That is to say, if for example the "buffer full" signal 13 remained at the 1 level beyond cycle C10, and ended in cycle C11, then the count value in the status counter 8 would become 2. In cycle C12, after a data read access of address 103 by the processor in cycle C11, the data transfer controller would first assert the bus utilization signal 31a, after the bus permission signal 30a has been asserted by the processor, and would then access the memory at address 101, and decrement the status counter 8 count (i.e. to 1). Then, since the signal 37c is still at the 1 level, the data transfer controller would continue to assert the bus utilization signal 31a, and would execute a second memory read access, to load the contents of address 102 into the output data bus 9b. The status counter 8 would thereby be again decremented, so that signal 37c would go to the 0 level, and hence the buses would be released to the processor, which would then write the latest processing result into address 103.

In this way, after the data transfer controller has gained control of the internal buses after the "buffer full" condition has ceased, it will thereafter successively read from memory and load into the output data bus those words which have previously been specified for transfer, but for which transfer has not yet been initiated. In this way, only a minimum of delay will occur in data transfer as a result of occurrence of the "output buffer full" condition.

It should also be noted that in practice, if the capacity of the output data bus is made sufficiently large (in relation to the difference between the data rates of the internal buses and the external network to which the processing element is connected, as described above), the occurrence of the "buffer full" condition can be made extremely rare.

In the above, the operation of the write address counter 109 of the read address generating section 10R shown in FIG. 9 has not been described. However the operation can be extremely simple, i.e. it is only necessary to assert the write address advancement signal 108 each time that a memory write access by the data transfer controller has been executed.

Figure 11:
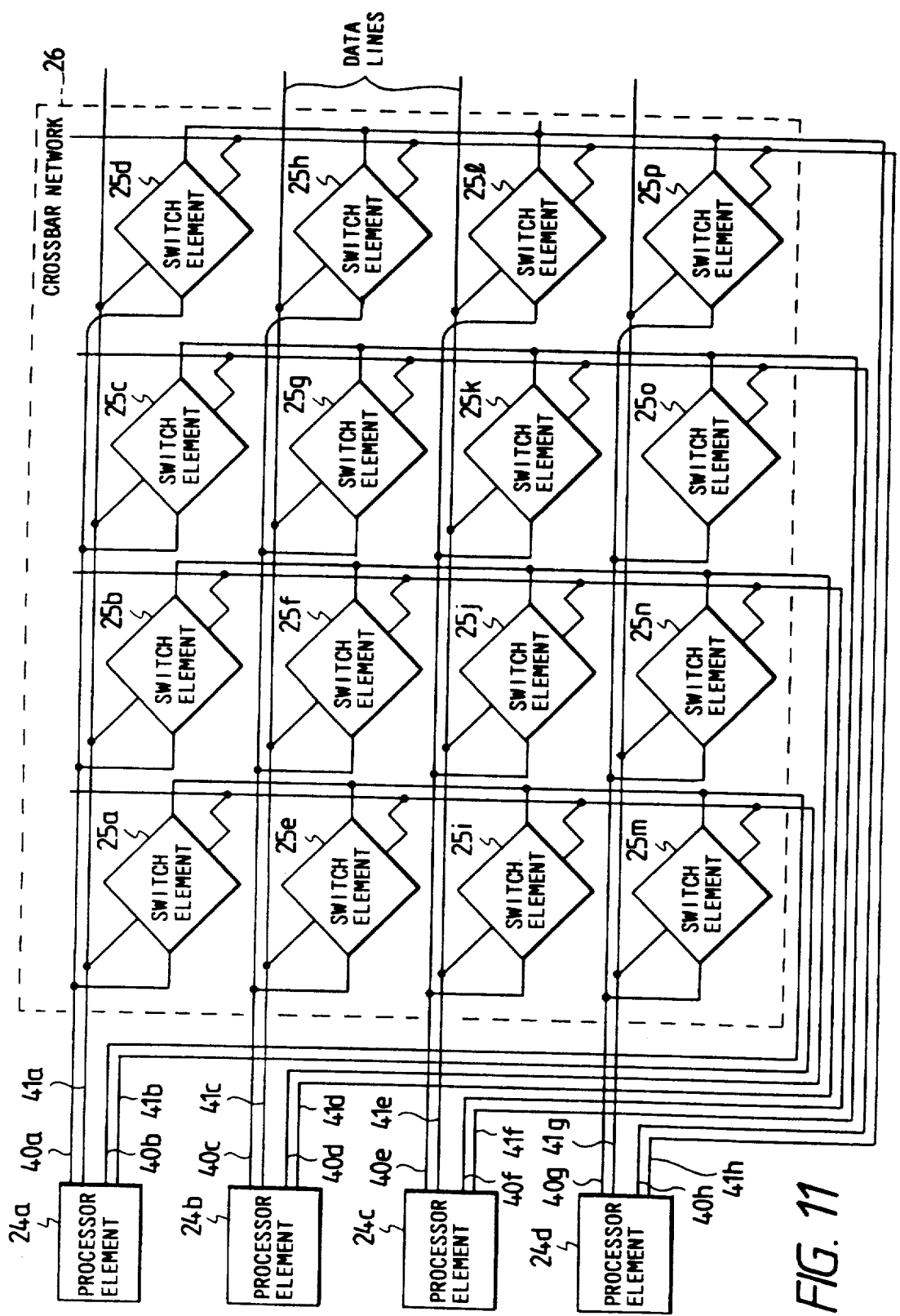
FIG. 11 is a general block diagram of a multiprocessor system employing a second embodiment of the method of the present invention.
Figure 12:
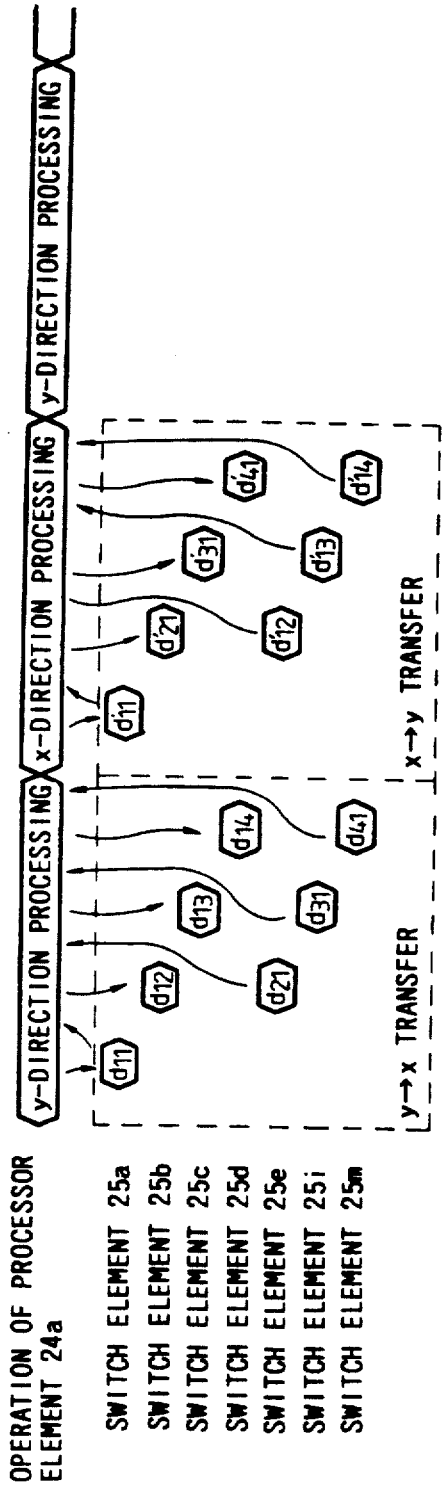
FIG. 12 is a timing diagram for describing the operation of the system of FIG. 10.

FIG. 11 is a general block diagram of a processor system utilizing a second embodiment of the method of the present invention, and FIG. 12 is a transfer timing diagram for illustrating the operation of one of the processing elements (24a) of that system. This embodiment differs from the first embodiment in having an expanded number of processing elements (designated as 24a, 24b, 24c, 24d) and a network which is a crossbar network 26. The crossbar network 26 contains 16 switching elements, designated as 25a to 25p, each of which actually is configured as a bidirectional FIFO (first in, first out) register whose contents can be written or read out by applying respective control signals 40a to 40h and 41a to 41h, generated by respective ones of the processing elements. This embodiment is for such applications as high-speed numerical simulation, and is especially applicable to use of the ADI (Alternate Direction Implicit) iterative method of solving 2-dimensional Poisson equations. This is a powerful analytical method for use in numeric simulation. With the ADI method, firstly one-dimensional processing of data is executed in the y-direction, then these data are edited in the x-direction. Next, one-dimensional processing is executed in the x-direction, and then the resultant data are edited in the y-direction. These processes are alternately repeated until a satisfactory degree of convergence is achieved.

Thus for example, the processing element 24a sends to the crossbar network 26 y-direction data which it has processed. Specifically, the processing element 24a sends a datum d11 to the switching element 25a, a datum d12 to the switching element 25b, d13 to the switching element 25c, and d14 to the switching element 25d, with these data being transferred via a data line 41a to the respective switching elements to be successively written into the switching elements 25a, 25b, 25c, and 25d in response to successive control signals 41a that are generated by the processing element 24a. At the same time (by the simultaneous data input and output transfer operation which has been described hereinabove for the first embodiment with reference to FIG. 4), the processing element 24a receives a datum d11 from the switching element 25a, a datum d21 from the switching element 25e, d31 from the switching element 25i, and d41 from the switching element 25m. That is to say, control signals 41b are successively generated by the processing element 24a whereby the aforementioned data d21 to d41 are successively read out from the switching elements 25a to 25m onto the data line 41b to be transferred into the processing element 24a. Thus for example the datum d21 being read out from the switching element 25e and transferred into the processing element 24a at the same time that d12 is being transferred out of the processing element 24a and written into the switching element 25b.

In this way, the one-dimensional y-direction data are rearrange into 1-dimensional x-direction data, i.e. a y to x direction transfer is executed. The processing element 24a then begins processing of the data which have been transferred therein and stored in its memory.

On completion of this processing, the processed data are successively transferred out of the processing element 24a in the same manner as that described above. That is to say, designating the resultant data as d11', d21', d31' and d41', the processing 24a transfers and writes in the datum d11' to the switching element 25a, d21' to the switching element 25b, d31' to the switching element 25c, and d41' to the switching element 25d. At the same time, the processing element 24a is receiving the result d11' from the switching element 25a, d12' from switching element 25e, d13' from switching element 25i, and d14' from switching element 25m, as these are successively read out from the switching elements.

In this way, the 1-dimensional x-direction data are rearranged into 1-dimensional y-direction data (i.e. an x-direction to y-direction transfer is executed).

The above operations are repetitively alternately executed until a desired degree of convergence of the data is achieved.

In the prior art, such a series of processing operations has inherently required a large amount of overhead, due to the time involved in transferring the data arrays from the y to the x-direction and from the x to the y-direction. However with the present invention, the data results can be immediately successively transferred, with each processing element simultaneously transferring data results out to the network while receiving new data transferred into it from the network. Thus, the aforementioned overhead can be substantially entirely eliminated.

It should be noted that when a multiprocessor system is used not only for the above type of ADI application but numeric processing applications in general, and in particular the important field of numeric simulation, there will be a high frequency of memory access operations by the processing of each processing element, and a high frequency of data transfers into and out of the respective processing elements. However with the method of the present invention as described hereinabove, the time that is required to execute data transfer into and out of each processing element can be entirely hidden within the processor execution time of the processing element, i.e. there is in effect no additional time required to execute each data transfer. It can thus be understood that the invention will be extremely valuable in achieving improved performance of multiprocessor systems in general.

It can be further understood that the present invention has the advantage of a simple configuration, without the need to use special devices such as a dual-port memory, and moreover that the number of processing elements in a multiprocessor system employing the method of the present invention can be easily expanded.

It can be further understood that the method of the present invention reduces the possibility of bus usage conflicts arising within a processing element. That is to say, in a prior art processing element such as that of FIG. 1 described above, in which the data transfer controller must itself always execute a memory read access before transferring a data word out of the processing element, such read accesses may conflict with the processor operation. However with the present invention, data which are required to be transferred out of the processing element are (in almost all cases) supplied to the data transfer controller by the processor at the same time that the processing is executing a memory access that is required as part of its own processing operations, so that no bus usage conflicts can arise. The actual performance achieved by the processor of each processing element can thereby be maximized.

It should be noted that various circuits other than those described hereinabove could be envisaged for implementing the method of the present invention, so that the invention is not limited to the configurations described.

What is claimed is:

1. A method of data transfer from a first to a second processing element over an external data bus, said first processing element including a processor, a memory and a data transfer controller, such data transfer controller connected to said external data bus, said processor, memory and data transfer controller mutually coupled to an internal data bus, the method comprising:
   (a) supplying a transfer command signal from said processor to the data transfer controller, for designating that a datum is to be transferred from the first to the second processing element;
   (b) concurrent with step (a), supplying the datum from one of either the processor and the memory to the internal data bus in response to a control signal from the processor; and
   (c) initiating the transfer of the datum from said internal data bus to said second processing element on said external data bus, under the control of the data transfer controller of said first processing element, in response to the transfer command signal.

2. A method of data transfer according to claim 1, in which the datum is supplied to the external data bus while the memory is being accessed by the processor.

3. A method of data transfer according to claim 2, in which a program of instructions that is executed by the processor includes instructions for designating memory access operations by the processor which are to be executed concurrently with generation of respective ones of the transfer command signals by the processor, and instructions for designating only memory access operations by the processor.

4. A method of data transfer according to claim 1, wherein said processor controls access to said internal bus and further comprises a step of storing a memory address of said datum that is to be transferred, and, with the data transfer controller having an output buffer coupled to the internal data bus for transferring the datum to the external bus in response to a nonavailability of said output buffer, storing a count representing a number of data for which transfer has not yet been initiated, and thereafter executing an equal number of successive memory read operations using the registered addresses and initiating transfer of these data, when said buffer becomes available and the internal data bus is released by the processor.

5. In a processing element formed of at least a processor, a memory and a data transfer controller respectively coupled to an internal data bus and address bus, the improvement whereby the data transfer controller comprises:

read address counter means for holding a value of a memory address in which is stored a datum corresponding to datum to be transferred in response to a most recently issued transfer command signal from the processor, and means for updating the address value each time that a transfer command signal is issued by the processor; and status counter means for maintaining a count of a total number of transfer command signals issued by the processor for which data transfers have not been respectively initiated by the data transfer controller;

in which said processor includes means for supplying a transfer command signal responsive to an internal bus availability signal from said processor while the data transfer controller is in an internal operating condition whereby said internal data internal bus is indicated to be available for an initiation of data transfer by said data transfer controller, the data transfer controller including means for initiating the data transfer and incrementing the address value held in the read address counter means, said data transfer controller including incrementing means, responsive to said internal bus availability signal, whereby each time that a transfer command signal is issued by the processor while the data transfer controller is in an internal operating condition in which initiation of data transfer is not possible, said incrementing means of the data transfer controller increments the count in the status counter means, and responsive to said internal bus availability signal indicating an availability of said internal data bus, said data transfer controller initiates a data transfer upon release of the internal data bus by the processor, said data transfer controller including means for supplying successive address values from the read address counter means to execute read-out from the memory of successive ones of the data for which transfer was designated while transfer initiation was not possible, and in which the data transfer controller includes means for incrementing the address value held in the read address counter means and decrementing the count in the status counter means each time that such a memory read access is executed.

6. A processing element according to claim 5, in which the data transfer controller comprises:

means for detecting a first condition in which a transfer command signal has been issued by the processor while the status counter means contains an initial value and the data transfer controller internal condition enables initiation of a data transfer operation, and for responding to detection of the first condition by generating a signal for incrementing the status counter means from the initial value, and by generating a first address increment signal for incrementing the address value held in the read address counter means and a signal for initiating a data transfer;

means for detecting a second condition in which the status counter means contains a value other than the initial value, the data transfer controller internal condition permits initiation of a data transfer operation, and the data bus and address bus have been released by the processor, and for responding to detection of the second condition by generating a second address increment signal for incrementing the address value held in the read address counter means and initiating a data transfer operation, and a signal for decrementing the contents of the status counter means, and for initiating a read access operation of the memory while supplying the contents of the read address counter means for the address bus.

7. A processing element which includes a processor, a memory, and a data transfer controller respectively coupled to a data bus, in which the processor includes means for generating, concurrent with generation of a transfer command signal for designating to the data transfer controller that a datum is to be transferred from the processing element to an external system, control signals for executing a memory access for accessing the datum in a predetermined address of the memory while the processor is supplying the datum to the data bus, the data transfer controller comprising:

an output data buffer coupled to the data bus for transferring the datum to the external system;

a status counter;

a read address counter; and a control circuit;

in which the control circuit includes means for controlling the read address counter to maintain therein the address value of the datum which is currently designated to be transferred, and in which the control circuit includes means responsive to the transfer command signal for loading the datum from the data bus into said output data buffer during the memory access by the processor and incrementing the address value in the read address counter, unless the output data buffer is currently full, and in which if the output data buffer is full, the control circuit includes means responsive to the transfer command signal for incrementing the status counter from a predetermined initial count value and subsequently, responsive to the buffer ceasing to be full and a cessation of memory accessing by the processor for detecting that the value in the status counter is other than the initial count value and responding to that condition by generating control signals for reading out to the data bus the datum from the address generated and held in the read address counter and for loading the datum into the output data buffer, while incrementing the read address counter and decrementing the status counter.

8. A multiprocessor system comprising a plurality of processing elements interconnected by a network for mutual interchange of data, each processing element comprising a processor and a memory linked by an internal data bus, a data transfer controller, a first input/output port coupled between the data transfer controller and the internal data bus, and a second input/output port coupled between the data transfer controller and the network, in which when a datum is to be transferred from an $i^{th}$ one of said processing elements to a $j^{th}$ one of said processing elements of the multiprocessor system, the processor of the $i^{th}$ processing element including means for generating a transfer command signal while at the same time executing a memory access operation, the data transfer controller of the $i^{th}$ processing element including means responsive to that transfer command signal for loading the datum into the first input/output port of the $i^{th}$ processing element while the datum is being transferred between the processor and memory of the $i^{th}$ processing element, and the datum is then transferred to the network from the second input/output port of the $i^{th}$ processing element, and in which the data transfer controller of the $j^{th}$ processing element includes means for loading the datum into the second input/output port of the $j^{th}$ processing element from the network, and then transferring the datum from the first input/output port of the $j^{th}$ processing element to the memory of the $j^{th}$ processing element to be written therein.

* * * * *